Feb. 8, 1966 A. D. PETRILLA ETAL 3,234,555

MODULAR SIGNAL CHANNELING SYSTEM

Filed July 6, 1961 4 Sheets-Sheet 1

INVENTORS
ANTHONY D. PETRILLA
WILLIAM E. SENTELL
BY
Robert D. Sanborn
ATTORNEY

INVENTORS
ANTHONY D. PETRILLA
WILLIAM E. SENTELL
BY
Robert D. Sanborn
ATTORNEY

MODULAR SIGNAL CHANNELING SYSTEM

Filed July 6, 1961 4 Sheets-Sheet 3

DUPLEX TRANSMITTER & RECEIVER

MULTIPLEX RECEIVER

INVENTORS
ANTHONY D. PETRILLA
WILLIAM E. SENTELL
BY
Robert D. Sanborn
ATTORNEY

DIPLEX TRANSMITTER

STANDBY

INVENTORS
ANTHONY D. PETRILLA
WILLIAM E. SENTELL
BY
Robert D. Sanborn
ATTORNEY

United States Patent Office 3,234,555

Patented Feb. 8, 1966

3,234,555

MODULAR SIGNAL CHANNELING SYSTEM

Anthony D. Petrilla, Riverton, N.J., and William E. Sentell, Penndel, Pa., assignors, by mesne assignments, to Philco Corporation, Philadelphia, Pa., a corporation of Delaware Filed July 6, 1961, Ser. No. 122,148
10 Claims. (Cl. 343—175)

The present invention relates to waveguide signal channeling systems and more particularly to modular waveguide signal channeling systems for coupling a selected channel to a plurality of sources and/or loads.

In microwave communication systems and the like it is frequently necessary to connect two or more transmitters or receivers to a single antenna. One of the transmitters or receivers may be a standby receiver or transmitter which is operative only if the main unit is inoperative or the transmitters and receivers may operate simultaneously on different assigned frequencies. In each instance it is necessary to arrange the microwave circuitry so that each signal is conducted to or from the antenna with a minimum of loss and with a minimum of interference with other signal sources or loads. If one or more transmitters and one or more receivers are connected to the same antenna it is necessary to provide isolation between the transmitter and receiver to protect the input of the receiver from the high level transmitter output signal. In many instances it may be necessary to change the number of transmitters and/or receivers as the mission of the system changes.

The systems available in the prior art for accomplishing the interconnection of multiple sources or loads to a single microwave line are generally bulky, complex and expensive. In addition, in many instances multiple filters are required which attenuate signals to an undesired extent. In most instances the microwave circuitry must be custom designed for the particular mission of the system. Thus any change in the number of components of the system or of their function in the system requires a major redesign of the microwave circuitry.

It is an object of the present invention to provide a universal microwave signal channeling module which can be used singly or in multiple to selectively channel microwave signals between a first group of sources and/or utilization circuits and a second group of sources and/or utilization circuits.

Still another object of the present invention is to provide a universal microwave signal channeling module which is compact, relatively inexpensive and easy to adjust.

A further object of the present invention is to provide a modular, low-loss, compact microwave coupling circuit composed of one or more similar signal channeling modules.

An additional object of the present invention is to provide a microwave signal multiplex circuit which may be readily modified to accommodate different numbers of inputs or outputs by the addition or removal of one or more similar signal channeling modules.

In general these and other objects of the present invention are achieved by forming the microwave signal multiplex circuit of one or more signal channeling modules, each of which comprises first and second juxtaposed energy transmission lines which are coupled adjacent first and second ends by means of first and second directional couplers which divide incident wave energy equally between the two transmission lines with a 90° phase difference in the energy in the two transmission lines. A tuned filter is disposed in one transmission line intermediate the two directional couplers and a second tuned filter, preferably identical to the first tuned filter, is disposed in the second transmission line at a point corresponding to the first filter in the first transmission line. Means may be provided for selectively altering the tuning of the two filters to accommodate or reject selected signals.

For a better understanding of the present invention together with other and further objects thereof, reference should now be had to the following detailed description which is to be read in conjunction with the accompanying drawings in which.

Figure 1:
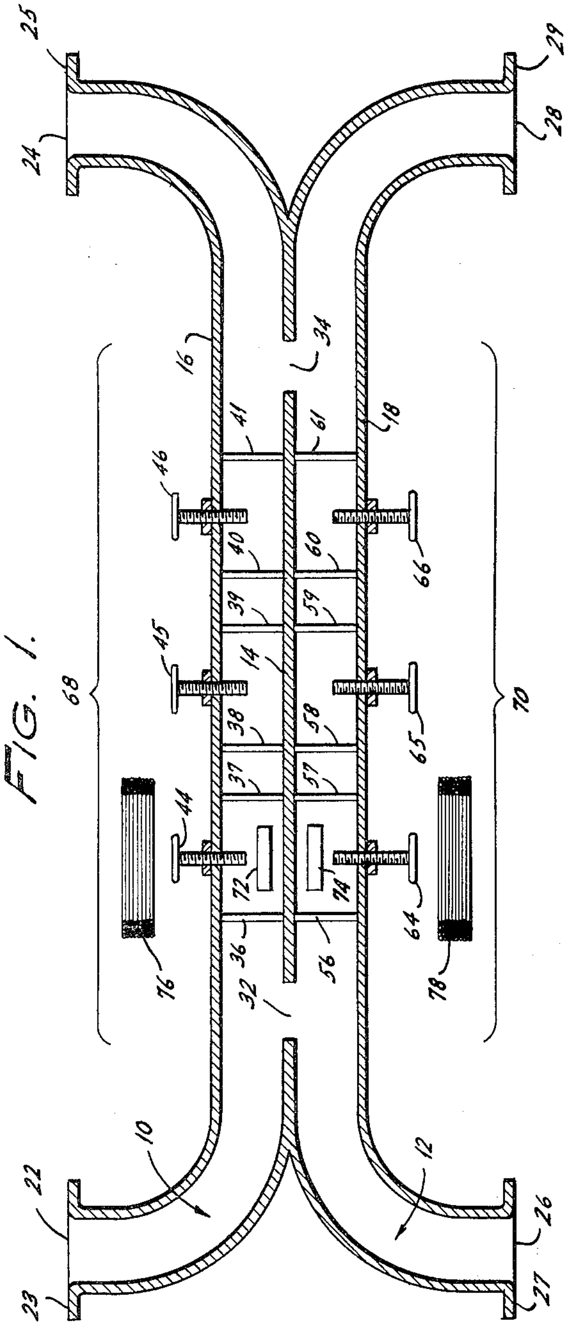
FIG. 1 is a cross-sectional view of the novel signal channeling module.
Figure 1A:
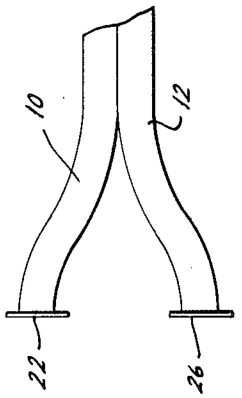
FIG. 1A is a fragmentary view showing a possible modification of the signal channeling module of FIG. 1.

In FIG. 1 a first waveguide 10 and a second waveguide 12 have a common wall 14. It will be assumed for sake of illustration that waveguides 10 and 12 are rectangular and that wall 14 is a common broad wall. However the invention is not to be limited to this particular showing except as may be required by the appended claims. Waveguides 10 and 12 are shown in cross section, the plane of the section being perpendicular to the broad walls 14, 16 and 18 of the waveguides. Waveguide 10 is provided with a coupling flange 23 at a first end 22 and a coupling flange 25 at the second end 24. In the embodiment of FIG. 1 waveguide 10 is U-shaped so that the plane of coupling flanges 23 and 25 is parallel to the broad wall 16 of the waveguide 10. Similarly, waveguide 12 is provided with coupling flanges 27 and 29 at ends 26 and 28, respectively, which lie in a plane parallel to broad wall 18. This physical shape of waveguides 10 and 12 permits a compact arrangement of sources, loads and coupling circuitry if more than one of the modules of FIG. 1 are employed. However the invention is not to be limited to this particular shape. For example, FIG. 1A shows a second advantageous arrangement of ends 22 and 26. The arrangement shown in FIG. 1A or any other convenient arrangement may be employed at one or both ends of the signal channeling module of FIG. 1.

The common broad wall 14 is formed with a gap 32 therein. Gap 32 is dimensioned to form a short-slot top-wall directional coupler which is also known in the art as a Riblet coupler. Wall 14 is formed with a second slot 34 adjacent the other ends of waveguides 10 and 12 which acts as a similar directional coupler. Gaps 32 and 34 will be referred to hereinafter as directional couplers 32 and 34. The characteristics of directional coupler 32 are such that the energy traveling down waveguide 10 from end 22 divides equally betwen waveguides 10 and 12 still traveling in the direction from left to right. At any point between directional couplers 32 and 34 there is a 90° phase difference between the energy in waveguide 10 and that in waveguide 12. No energy travels down waveguide 12 toward end 26.

Figure 2:
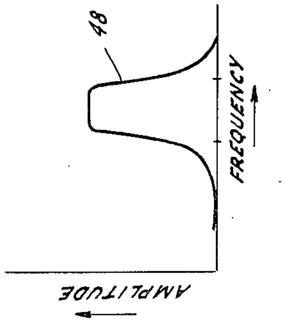
FIG. 2 is a plot showing the passband characteristic of the filters of FIG. 1.

A series of inductive posts 36–41 are provided in waveguide 10 between direction couplers 32 and 34. Posts 36–41 together with capacitive tuning screws 44–46 provide a multi-section filter 68 having a passband characteristic as shown at 48 in FIG. 2. By proper choice of the size and spacing of the posts 36–41 and the positions of capacitive screws 44–46 the passband 48 may be made to have a flat top and steep sides. The design of wave guide filters of this type is well known and hence will not be further described.

Posts 56–61 and capacitive tuning screws 64–66 in wave-guide 12 form a second filter 70 which is substantially identical to the filter 68. The section of filter 68 nearest coupler 32 is provided with a slab of ferromagnetic material 72. The corresponding section of filter 70 is provided with a similar slab 74. A tuning control means comprising coils 76 and 78 provides means for equally influencing slabs 72 and 74 with an externally generated magnetic field. Changing the magnetic field to which slabs 72 and 74 are subjected changes the tuning of filters 68 and 70. In many instances it is not necessary to provide signal responsive means for changing the tuning of filters 68 and 70. In such instances the slabs 72 and 74 and the coils 76 and 78 may be omitted.

Figure 3:
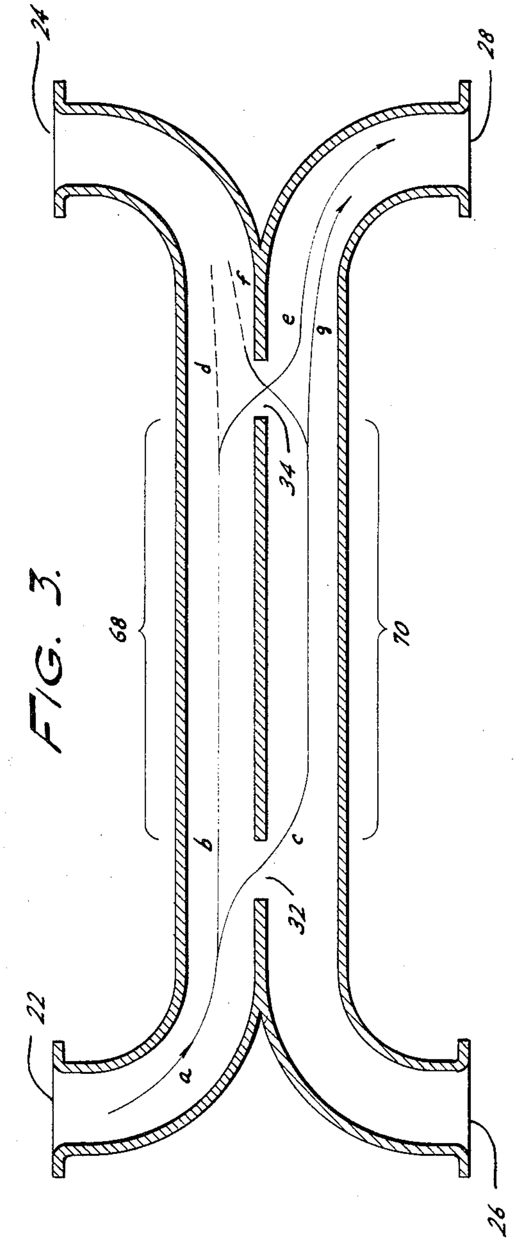
FIG. 3 is a simplified view of signal channeling module of FIG. 1 showing certain of the signal paths for signal energy having a frequency within the passband of the filters of FIG. 1.
Figure 4:
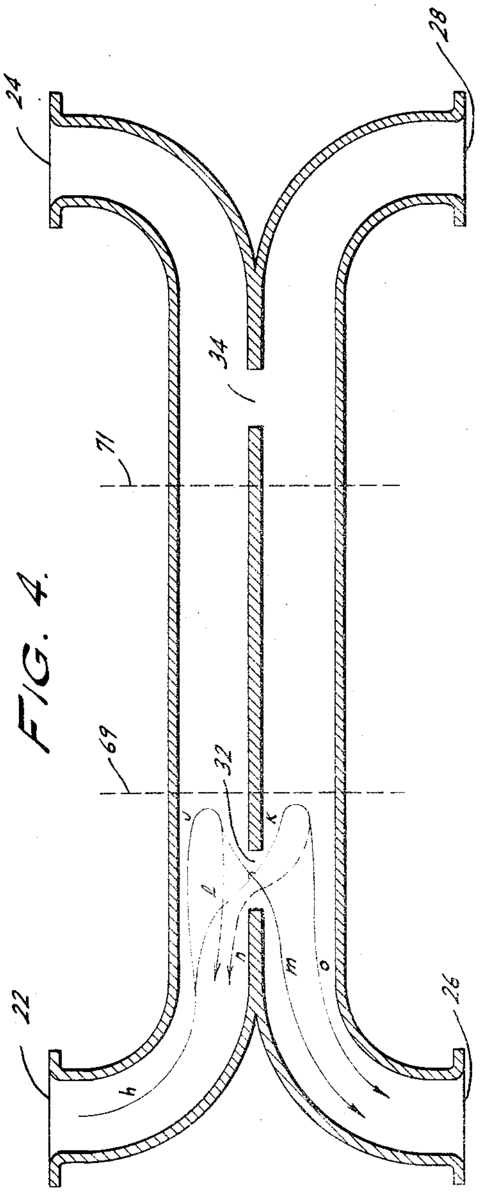
FIG. 4 is a similar view showing signal paths for energy of a different frequency.

The operation of the signal channeling module shown in FIG. 1 will be explained with reference to FIGS. 3 and 4. Energy supplied at input end 22 at the frequency to which filters 68 and 70 are tuned will pass down wave guide 10 along path *a* to directional coupler 32. At this point, the energy will divide equally between paths *b* and *c* in waveguides 10 and 12 and pass through filters 68 and 70 with little attenuation. At directional coupler 34 energy in path *b* in waveguide 10 will divide equally between the paths *d* and *e* in waveguides 10 and 12 with the accompanying 90° phase difference between the energy in the two paths *d* and *e*. Similarly, energy traveling along path *c* will divide equally at directional coupler 34 between paths *f* and *g* in waveguides 10 and 12. Energy in path *d* is equal in amplitude to but 180° out of phase with the energy in path *f*. This results in mutual cancellation of signals traveling in paths *d* and *f* so that no signal reaches end 24. The signals in paths *e* and *g* are in phase and hence add linearly. It can be shown that substantially all of the energy supplied at input 22 appears at end 28. Substantially none of the energy supplied at input 22 will appear at end 26 due to the directional coupling effect of coupler 32. Since the signal channeling module of FIG. 1 is symmetrical, energy supplied at end 24 will appear at end 26 with substantially no energy at ends 22 and 28. Similarly energy supplied at end 28 will appear at end 22 only and energy supplied at end 26 will appear at end 24 only.

If the frequency of the energy supplied at end 22 lies outside the passband of filters 68 and 70, these two filters will appear as short circuits. The short circuit terminations are represented by the broken lines 69 and 71 in FIG. 4. Energy traveling along path *h* will divide equally between paths *j* and *k* in waveguides 10 and 12 at coupler 32. Energy in paths *j* and *k* will be reflected at 69 and again return to coupler 32. The division of energy into paths *l*, *m*, *n* and *o* is such that mutual cancellation occurs in paths *l* and *n* and mutual reinforcement occurs in paths *m* and *o*. The net effect is that substantially all of the energy introduced at end 22 will appear at end 26. Again because of the symmetry of the signal channeling module, energy introduced at end 24 of FIG. 1 will appear at end 28. Only the sections of waveguides 10 and 12 between coupler 32 and effective termination 69 and coupler 34 and effective termination 71 are mismatched. The presence of an apparent short circuit at region 69 has no effect on the input impedance at end 22.

Figure 5:
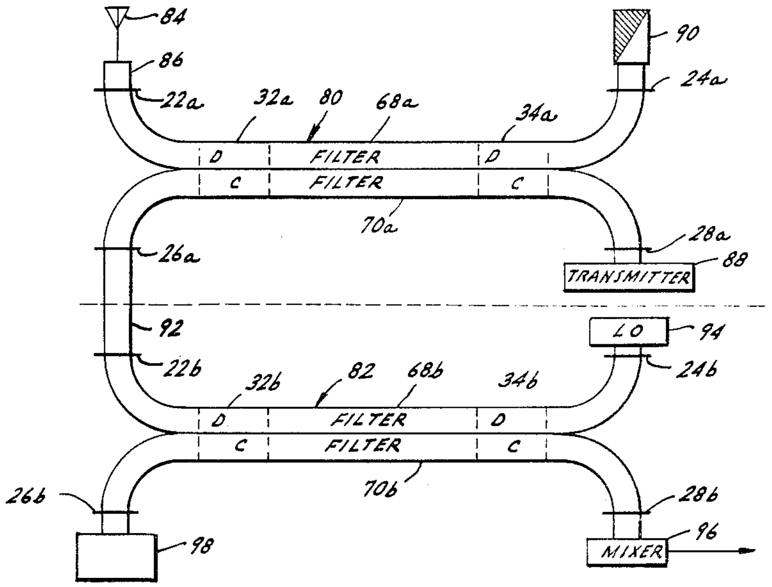
FIG. 5 is a circuit for coupling a receiver and a transmitter to a single antenna by means of two of the signal channeling modules of FIG. 1.
Figure 6:
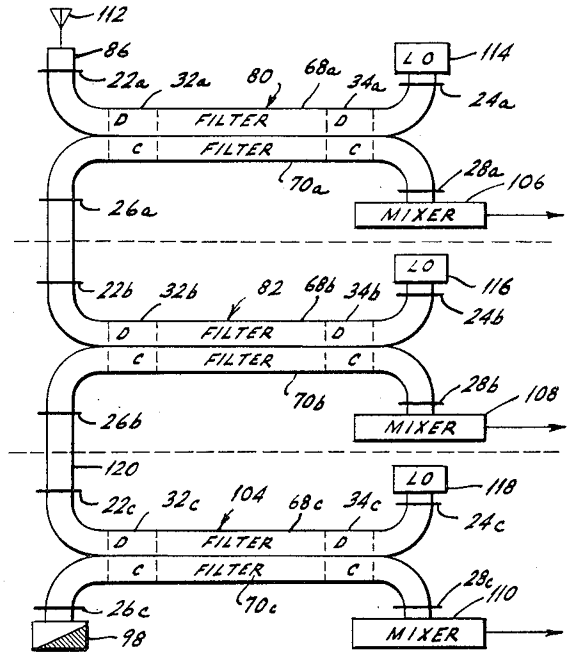
FIG. 6 is a circuit for coupling a plurality of receivers to a single antenna.
Figure 7:
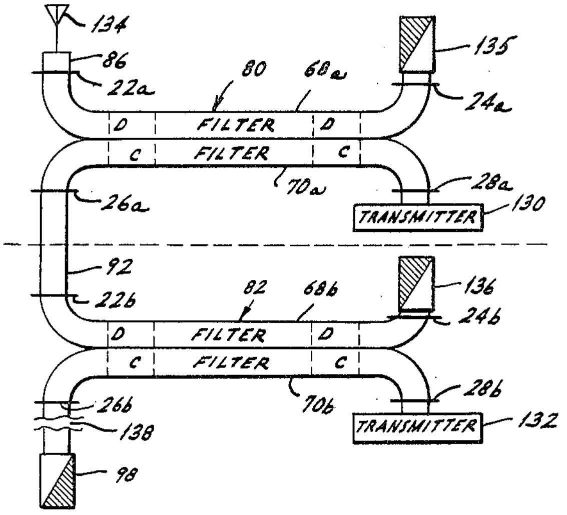
FIG. 7 is a circuit for coupling a plurality of transmitters to a single antenna.

In the circuits shown in FIGS. 5–7 means for detuning filters 68 and 70 are not required and hence are not shown. FIG. 5 is a microwave circuit employing two signal channeling modules 80 and 82 of the type shown in FIG. 1. The circuit of FIG. 5 couples a transmitter 88 and a receiver represented by mixer 96 to a common antenna 84. The transmitter and receiver may operate on different frequencies. For example, in microwave communication systems the transmitter and receiver at each relay station frequently operate on different assigned channels. In FIG. 5 parts of signal channeling module 80 corresponding to similar parts in the module of FIG. 1 have been designated by the same reference numeral with the addition of the letter *a*. Similarly parts parts in module 82 have been designated by the same reference numeral with the addition of the letter *b*. As shown in FIG. 5 the system antenna 84 is connected by suitable waveguide section 86 to end 22*a* of signal channeling module 80. Transmitter 88 is coupled to end 28*a*. An absorbing load 90 is coupled to end 24*a*. End 26*a* is coupled to end 22*b* by a waveguide section 92. A local oscillator 94 is coupled to end 24*b*. A heterodyne mixer 96 is coupled to end 28*b*. An energy absorbing circuit 98 is coupled to end 26*b*. Circuit 98 may be an absorbing load such as load 90 or it may be another signal channeling module of the type shown at 80 or 82 with an additional transmitter or receiver connected thereto. Preferably the last signal channeling module in the series has its end 26 terminated with an energy absorbing load.

Filters 68*a* and 70*a* of signal channeling module 80 are tuned to the frequency of transmitter 88. Filters 68*b* and 70*b* of signal channeling module 82 are tuned to the frequency of the signal to be supplied to mixer 96. Of filters 68*a*, 70*a*, 68*b*, and 70*b* are all tuned to the same frequency, the isolation between transmitter 88 and mixer 96 is provided solely by the directional coupler 32*a*. However if filters 68*b* and 70*b* are tuned to a frequency different from that of filters 68*a* and 70*a*, the isolation between transmitter 88 and mixer 96 is provided both by directional coupler 32*a* and by filters 68*b* and 70*b*, that is, the small amount of energy which may appear at end 26*a* due to stray reflections or the like in signal channeling module 80 are rejected by filters 68*b* and 70*b* and hence are directed toward absorbing circuit 98. However, the energy from transmitter 88 may pass without appreciable attenuation to system antenna 84 by way of output end 22*a*. Similarly energy at the frequency to be received is rejected by filters 68*a* and 70*a* and hence is directed to end 26*a*. The energy received at end 22*b* passes through filters 68*b* and 70*b* with little attenuation to mixer 96 coupled to end 28*b*. Very little of this energy is lost in absorbing load 98 or in local oscillator 94. Energy at the local oscillator frequency will not be passed by filters 68*b* and 70*b*. Hence local oscillator energy may be introduced at end 24*b* and supplied to mixer 96 at end 28*b*. It will be noted that any local oscillator energy leaking through filters 68*b* and 70*b* will be directed toward end 26*b* and absorbed in circuit 98. Therefore very little, if any, local oscillator energy will reach the system antenna 84.

FIG. 6 shows three signal channeling modules 80, 82 and 104 arranged to connect three receivers represented by mixers 106, 108 and 110 to a common antenna 112.

Signal channeling modules 80 and 82 may be identical to the corresponding modules of FIG. 5. Module 104 may be identical to modules 80 and 82 except for the tuning of the filters 68*c* and 70*c*. The filters 68*a* and 70*a* of module 80 are tuned to the frequency of the signal to be supplied to mixer 106. Similarly, filters 68*b* and 70*b* are tuned to the frequency of the signal to be supplied to mixer 108 and filters 68*c* and 70*c* are tuned to the frequency of the signal to be supplied to mixer 110. Local oscillators 114, 116 and 118 are connected to ends 24*a*, 24*b* and 24*c*, respectively. End 26*b* of signal channeling module 82 is connected to end 22*c* of module 104 by way of waveguide section 120. Circuit 98 of FIG. 6 may correspond to the similarly numbered element of FIG. 5.

It will be seen that energy intended for any one of the mixers 106, 108 or 110 will pass from antenna 112 to that mixer through only one set of filters. Thus the insertion loss measured from antenna 112 to mixer 106, for example, is only that of directional couplers 32*a* and 34*a* and filters 68*a* and 70*a*. Energy intended for mixer 104 is rejected by filters 68*a* and 70*a* but passes through filters 68*b* and 70*b*. Energy intended for mixer 110 is rejected by filters 68*a*, 70*a*, 68*b* and 70*b* but is passed by filters 68*c* and 70*c*. Energy not at the frequency to be received by any of the three mixers 106, 108 and 110 is rejected by the three pairs of filters and is directed to absorbing circuit 98. Since the filters in each of the signal channeling modules provide almost total reflection for energy outside the passband of that filter, the insertion loss for energy intended for mixer 110 is only slightly greater than that for energy intended for mixer 106. It will be seen that additional receivers may be multiplexed to antenna 112 by replacing absorbing load 98 with signal channeling modules similar to module 80 but having filters tuned to the appropriate frequency of reception of the added receivers. Similarly, signal channeling module 104 may be removed and replaced by an absorbing termination at end 26*b* without affecting the operation of mixers 106 and 108.

FIG. 7 illustrates a microwave circuit for coupling two transmitters 130 and 132 to a common antenna 134. It will be seen that the system in FIG. 7 is the same as the first two sections of FIG. 6 except that transmitters 130 and 132 replace mixers 106 and 110 and absorptive loads 135 and 136 replace local oscillators 114 and 118 of FIG. 6. The break at 138 between end 26*b* and load 98 indicates schematically that additional signal channeling modules similar to modules 80 and 82 may be added to permit additional transmitters to be coupled to the common antenna 134. In the embodiment of FIG. 7, it is assumed that transmitters 130 and 132 operate on different carrier frequencies and that the filters in module 80 are tuned to the frequency of transmitter 130 and the filters in module 82 are tuned to the frequency of transmitter 132.

Figure 8:
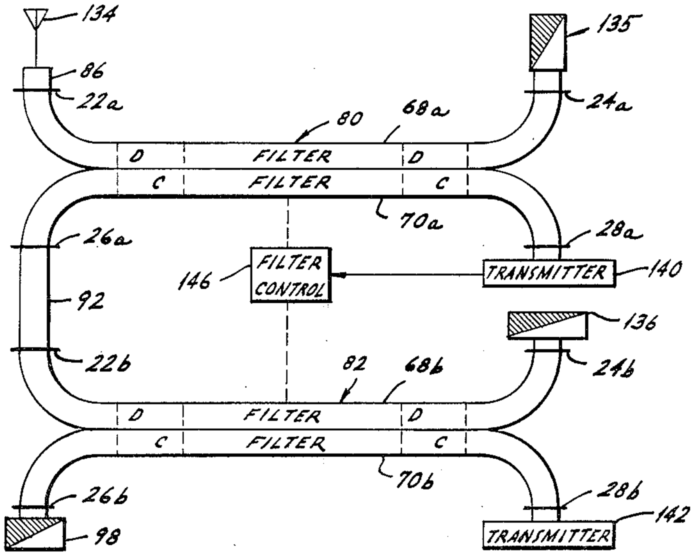
FIG. 8 is a circuit for connecting a main transmitter and a standby transmitter to a single antenna.

FIG. 8 illustrates a circuit for connecting either a main transmitter 140 or a standby transmitter 142 to the same antenna 134. The arrangement of signal channeling modules 80 and 82 and loads 135 and 136 are the same as shown in FIG. 7. However in the embodiment of FIG. 8 transmitters 140 and 142 operate on the same carrier frequency. At least the first section of the filters in modules 80 and 82 are provided with signal responsive frequency changing elements such as the ferromagnetic slabs 72 and 74 of FIG. 1. A filter control 146, which may comprise magnetic coils 76 and 78, are coupled to transmitter 140 so as to be energized if transmitter 140 is operating in the normal fashion. The characteristics of the filters in coupling component 80 are selected so that the passband of filters 68*a* and 70*a* is centered about the frequency of transmitter 140 with the magnetic field applied but is well removed from the frequency of transmission of transmitter 140 with the magnetic field removed. Conversely, the filters 68*b* and 70*b* in signal channeling module 82 are so tuned that the passbands of these filters are well removed from the frequency of transmitter 142 if the magnetic field is applied but are centered about the frequency of transmission of transmitter 142 if the magnetic field is removed. Thus it will be seen that if the main transmitter 140 is operating normally and the magnetic field is applied to the filters in modules 80 and 82, the energy from the main transmitter 140 will be directed to the system antenna 134 and the energy from the standby transmitter 142 will be directed to the absorptive load 136. If for some reason the main transmitter 140 fails to operate normally, the filter control 146 ceases to supply magnetic field to the filters in modules 80 and 82. Therefore the signal from standby transmitter 142 is coupled to the system antenna 134 and any output energy from main transmitter 140 is directed to absorptive load 135. The filter control 146 has not been shown in detail since means for accomplishing its function are well known in the art. For example, it may comprise a simple filter tuned to the normal frequency of transmission of transmitter 140, a detector for detecting the output of the filter and a relay responsive to the output of the detector. While the filter control 146 has been described in terms of magnetic field applied to a ferromagnetic material, it is obvious that the tuning of the filters may be accomplished by changing the electric field applied to a ferroelectric member or by means of mechanical movement of one or more elements of the filter circuit. In general, detuning one section of the filter will provide sufficient attenuation for most applications. However, it lies within the scope of the invention to provide signal actuated frequency control means in more than one section of the filter.

It will be seen from the foregoing discussion that the coupling system formed of one or more coupling components of the type shown in FIG. 1 provides a very compact system having low insertion loss for desired signals, a high degree of separation between circuits coupled to the system and great flexibility in circuit structure. The invention is not limited in its application to systems for coupling an antenna to transmitters and/or receivers. It may be employed whenever three or more circuit elements are to be coupled together. Also other forms of transmission lines and directional couplers may be substituted for the rectangular waveguides and short slot couplers shown in the drawings.

While the invention has been described with reference to the preferred embodiments thereof, it will be apparent that various modifications and other embodiments thereof will occur to those skilled in the art within the scope of the invention. Accordingly we desire the scope of our invention to be limited only by the appended claims.

We claim:

1. A high frequency transmitter and receiver signal channeling system comprising:

(a) a first module comprising first and second juxtaposed energy transmission lines having adjacent first ends and adjacent second ends, said lines being coupled at two spaced points intermediate said ends by respective first and second directional couplers, each constructed to divide incident wave energy equally between said lines with a 90° phase difference, said first and second lines including respective first and second tuned filters disposed in corresponding positions in said lines between said spaced points and having substantially identical frequency bandpass characteristics, (b) a second module geometrically similar to said first module and comprising third and fourth juxtaposed energy transmission lines similar to said first and second lines and including third and fourth directional couplers similar to said first and second directional couplers and third and fourth filters similar to said first and second filters, said third and fourth filters having substantially identical frequency bandpass characteristics different from those of said first and second filters, (c) means coupling the first end of said second line to the first end of said third line, (d) a transmitting and receiving antenna coupled to the first end of said first line, (e) a transmitter arranged to supply a signal whose frequency lies substantially within the passband of said first and second filters, said transmitter connected to the second end of said second line, (f) receiver means, including a signal mixer, arranged to receive a signal whose frequency lies substantially within the passband of said third and fourth filters, said receiver means connected to the second end of said fourth line, and (g) a local oscillator arranged to supply a signal whose frequency is different from the frequencies of the signal transmitted and the signal received, said oscillator connected to the second end of said third line.

2. The system of claim 1 wherein the second end of said first line and the first end of said fourth line are connected to respective power absorbing terminations.

3. The system of claim 1 wherein said means of clause (c) is a waveguide section having first and second end openings only, said first end coupled to the first end of said second line and said second end coupled to the first end of said third line.

4. A high frequency multiplex receiver signal channeling system comprising:

(a) a first module comprising first and second juxtaposed energy transmission lines having adjacent first ends and adjacent second ends, said lines being coupled at two spaced points intermediate said ends by respective first and second directional couplers, each constructed to divide incident wave energy equally between said lines with a 90° phase difference, said first and second lines including respective first and second tuned filters disposed in corresponding positions in said lines between said spaced points and having substantially identical frequency bandpass characteristics, (b) a second module geometrically similar to said first module and comprising third and fourth juxtaposed energy transmission lines similar to said first and second lines and including third and fourth directional couplers similar to said first and second directional couplers, and third and fourth filters similar to said first and second filters, said third and fourth filters having substantially identical frequency bandpass characteristics different from those of said first and second filters, (c) means coupling the first end of said second line to the first end of said third line, (d) an antenna coupled to the first end of said first line, (e) first receiver means, including a signal mixer, arranged to receive a signal whose frequency lies substantially within the passband of said first and second filters, said first receiver means connected to the second end of said second line, (f) a first local oscillator arranged to supply a signal whose frequency lies outside the passband of said first and second filters, said oscillator connected to the second input of said first line, (g) second receiver means, including a signal mixer, arranged to receive a signal whose frequency lies substantially within the passband of said third and fourth filters, said second receiver means connected to the second end of said fourth line, and (h) a second local oscillator arranged to supply a signal whose frequency lies outside the passband of said third and fourth filters, said oscillator connected to the second input of said third line.

5. The system of claim 4 wherein the first input of said fourth line is connected to a power absorbing termination.

6. The system of claim 4 further including:

(i) a third module geometrically similar to said first module and comprising fifth and sixth juxtaposed energy transmission lines similar to said first and second lines and including fifth and sixth directional couplers similar to said first and second directional couplers and fifth and sixth filters similar to said first and second filters, said fifth and sixth filters having substantially identical frequency bandpass characteristics different from those of said first and second and said third and fourth filters, (j) means coupling the first end of said fourth line to the first end of said third line, (k) third receiver means, including a signal mixer arranged to receive a signal whose frequency lies substantially within the passband of said fifth and sixth filters, said third receiver means connected to the second input of said sixth line, and (l) a third local oscillator arranged to supply a signal whose frequency lies outside the passband of said fifth and sixth filters, said oscillator connected to the second input of said fifth line.

7. The system of claim 6 further including a power absorbing termination connected to the first input of said sixth line.

8. A high frequency standby transmitting system comprising:

(a) a first module comprising first and second juxtaposed energy transmission lines having adjacent first ends and adjacent second ends, said lines being coupled at two spaced points intermediate said ends by respective first and second directional couplers, each constructed to divide incident wave energy equally between said lines with a 90° phase difference, said first and second lines including respective first and second tuned filters disposed in corresponding positions in said lines between said spaced points and having substantially identical frequency bandpass characteristics, (b) a second module geometrically similar to said first module and comprising third and fourth juxtaposed energy transmission lines similar to said first and second lines and including third and fourth directional couplers similar to said first and second directional couplers and third and fourth filters similar to said first and second filters, said third and fourth filters having substantially identical frequency bandpass characteristics different from those of said first and second filters, (c) means coupling the first end of said second line to the first end of said third line, (d) an antenna coupled to the first end of said first line, (e) a main transmitter arranged to supply a signal whose frequency lies substantially within the passband of said first and second filters, said transmitter connected to the second end of said second line, (f) a standby transmitter arranged to supply a signal whose frequency also lies substantially within the passband of said first and second filters, said standby transmitter connected to the second end of said fourth line, (g) connected to the output of said main transistor filter control means for: (1) altering the passband of said first and second filters to a value subtantially different from the frequency of the signal supplied by said main transmitter and (2) simultaneously altering the passband of said third and fourth filters to a value approximating the passband of said first and second filters prior to said alteration in response to termination of normal output of said main transmitter.

9. The system of claim 8 wherein said filters include ferromagnetic slabs for controlling the response thereof and said filter control means is arranged to control a magnetic field applied to said slabs.

10. The system of claim 8 wherein the second end of said first line and the first end of said fourth line are connected to respective power absorbing terminations.

References Cited by the Examiner

UNITED STATES PATENTS

| | | | |
|---|---|---|---|
| 2,854,636 | 9/1958 | Maire | 333—10 |
| 2,858,513 | 10/1958 | Lewin | 333—73 |
| 2,883,629 | 4/1959 | Suhl | 333—24 |
| 3,008,097 | 11/1961 | Tetenbaum et al. | 333—10 |
| 3,056,096 | 9/1962 | Vane | 333—10 |

HERMAN KARL SAALBACH, *Primary Examiner.*

ELI LIEBERMAN, *Examiner.*